(12) United States Patent
Hauck

(10) Patent No.: US 6,206,537 B1
(45) Date of Patent: Mar. 27, 2001

(54) ELECTRICALLY ILLUMINATED ATTENTION-ATTRACTING DEVICES AND METHOD OF USING SAME

(76) Inventor: Lane T. Hauck, 5346 Bragg St., San Diego, CA (US) 92122

( * ) Notice: Subject to any disclaimer, the term of this patent is extended or adjusted under 35 U.S.C. 154(b) by 0 days.

(21) Appl. No.: 09/219,688

(22) Filed: Dec. 23, 1998

Related U.S. Application Data

(63) Continuation-in-part of application No. 08/558,806, filed on Nov. 15, 1995.

(51) Int. Cl.⁷ ................................................. F21W 131/00
(52) U.S. Cl. .......................... 362/102; 362/800; 362/802
(58) Field of Search ..................... 362/103, 101, 362/102, 104, 105, 106, 107, 108, 800, 802

(56) References Cited

U.S. PATENT DOCUMENTS

| | | | | |
|---|---|---|---|---|
| 4,158,922 | * | 6/1979 | Dana, III | 362/103 X |
| 5,143,439 | * | 9/1992 | Lewis et al. | 362/103 |
| 5,188,447 | * | 2/1993 | Chiang et al. | 362/103 |
| 5,276,595 | * | 1/1994 | Patrice | 362/800 X |
| 5,357,697 | * | 10/1994 | Lin | 362/103 X |
| 5,381,615 | * | 1/1995 | MacMillan | 362/103 X |
| 5,394,312 | * | 2/1995 | Bland | 362/103 |
| 5,406,724 | * | 4/1995 | Lin | 362/103 X |
| 5,408,764 | * | 4/1995 | Wut | 362/103 X |
| 5,418,697 | * | 5/1995 | Chiou | 362/800 X |
| 5,419,061 | * | 5/1995 | Barrocas | 362/103 X |
| 5,430,621 | * | 7/1995 | Raskas | 362/103 X |
| 5,438,488 | * | 8/1995 | Dion | 362/103 |
| 5,438,493 | * | 8/1995 | Tseng | 362/103 |
| 5,457,900 | * | 10/1995 | Roy | 362/103 X |
| 5,473,518 | * | 12/1995 | Haber et al. | 362/103 |
| 5,483,759 | * | 1/1996 | Silverman | 362/103 X |
| 5,510,961 | * | 4/1996 | Peng | 362/800 X |
| 5,523,927 | * | 6/1996 | Gokey | 362/103 |
| 5,535,106 | * | 7/1996 | Tangen | 362/800 X |
| 5,546,681 | * | 8/1996 | Goldston et al. | 362/802 X |
| 5,561,414 | * | 10/1996 | Chin | 362/802 X |
| 5,575,553 | * | 11/1996 | Tipton | 362/800 X |
| 5,599,088 | * | 2/1997 | Chien | 362/103 |
| 5,624,175 | * | 4/1997 | Gelormino et al. | 362/800 X |
| 5,644,858 | * | 7/1997 | Bemis | 362/103 X |
| 5,667,290 | * | 9/1997 | Cioletti et al. | 362/800 X |
| 5,704,706 | * | 1/1998 | Goldston et al. | 362/103 |
| 5,732,486 | * | 3/1998 | Rapisarda | 362/103 X |
| 5,746,499 | * | 5/1998 | Ratcliffe et al. | 362/103 |

* cited by examiner

*Primary Examiner*—Laura K. Tso
(74) *Attorney, Agent, or Firm*—Foley & Lardner; Bernard L. Kleinke

(57) ABSTRACT

An electrically illuminated attention-attracting device and a method of using it, relate to using a device emitting alternatingly at least two different colored lights. The device is turned on and off alternatingly to emit alternatingly the different colored lights. The device is moved to produce a visually perceptible light pattern comprising a sequence of alternating multicolored light images where the length of each one of the colored light images varies with the speed of movement of the device.

11 Claims, 7 Drawing Sheets

ELECTRICALLY ILLUMINATED ATTENTION-ATTRACTING DEVICES AND METHOD OF USING SAME

CROSS-REFERENCE TO RELATED APPLICATIONS

This patent application is a continuation-in-part patent application of pending U.S. patent application Ser. No. 08/558,806 filed Nov. 15, 1995, entitled, "Electrically Illuminated Attention-Attracting Devices and Method of Using Same" which is incorporated herein by reference.

BACKGROUND OF THE INVENTION

1. Technical Field

The present invention relates in general to an electrically illuminated attention-attracting device, and a method of using it.

2. Background Art

Bicycle flashers are examples of electrical devices designed to attract attention. Because a flashing light is more noticeable than one that is constantly on, a bicycle flasher mounted on the rear of the bicycle or worn by the rider is an effective safety device. However, the flashing light can be annoying, and even distracting.

Light sticks are sold at outdoor sporting events such as baseball games, and are designed to attract attention in a more pleasant manner. Such devices are powered by a chemical reaction to provide the illumination. Such devices, therefore, use a non-replenishable power source, and when depleted, they are not useful and are discarded. Thus, it would be preferable to have a novel attention attracting device, which would be powered by a replenishable power source, so that the device would be re-usable.

It would be desirable to have a novel attention-attracting device which is inexpensive to manufacture, and yet it is re-useable. Ideally, such a device should be adaptable to various different applications designed to attract attention, in an aesthetically pleasing manner. The device should also be useful for safety purposes, and be interesting and intriguing to use.

DISCLOSURE OF INVENTION

Therefore, the principal object of the present invention is to provide a new and improved attention attracting device, wherein the effect produced by the device is novel and interesting.

Another object of the present invention is to provide such a new and improved attention attracting device, which is relatively inexpensive to manufacture, and which can be used in a variety of different applications.

Briefly, the above and further objects of the present invention are realized by providing a new and improved electrically illuminated attention attracting device, which is capable of producing intriguing light patterns, and which is capable of a wide variety of different applications.

An electrically illuminated attention attracting device and a method of using it, relate to using a device emitting alternatingly at least two different colored lights. The device is turned on and off alternatingly to emit alternatingly the different colored lights. The device is then moved to provide a visually perceptible light pattern comprising a sequence of alternating multicolored light images where the length of each one of the colored light images varies with the speed of movement of the device.

The inventive electronic attention-attracting device includes a multi-color light emitting diode (LED) attached to an apparatus that enables the LED to be moved quickly in space. In one form of the invention, the device includes a flexible wire or cable with the LED at one end and a battery and electronic circuit mounted in a hand held housing at the other end. Such a wire or cable is about three feet long in one form of the invention. A user could grasp the LED and move it quickly about in space, thereby achieving a sparkler-like effect. Alternatively, the user could twirl the LED in a circular pattern by swinging the wire in a circular configuration about the hand held housing. The resulting effect is to "write" a circle of multicolored light in the air.

According to the invention, the LED is pulsed, causing light bars to appear rather than a continuous light pattern. The LED is capable of pulsing with more than one color. The circuit in the housing of the device controls the LED such that it not only pulses, but it pulses in different colors. When such a device is moved rapidly, for example by being twirled in a circle at a fast rate, different colored bars or lines of light are perceived visually by an observer. Where two colors are employed, the colored bars or lines alternate. The resulting light pattern image is startling and attractive. If the color pulsing rate is constant, twirling the LED faster produces proportionately longer color bars. In this regard, the speed of rotation is proportioned to the perceived lengths of the colored bars or lines.

When such a device is attached to a moving body such as a vehicle including, but not limited to, an automobile, bicycle, and others, relative motion between the moving body and a stationary observer causes a colored bar pattern to appear in the air. This gives more visibility and interest than a device such as a bicycle flasher. When the device is attached to the spokes of a bicycle, the motion is more rapid and a very interesting spiral pattern of multicolored bars is produced.

When the device is twirled rapidly in a circular configuration, a colorful pattern of multi-color alternating semi-circular bars appears in the air. Since the device is powered by an inexpensive battery, the source of power can be replaced.

According to the invention, the device is included at a desired location along a jump rope, so that the act of jumping rope produces multicolored circles in the air. The appearance of multicolored light bars greatly enhances the visual appeal of the jump rope.

According to another form of the present invention, the device is included in a throwable device, so that the light pattern described in the air is a spiraling pattern of multiple color bars, thus a very interesting and attention attracting effect is created. Still another form of the present invention relates to the device included in a shoe to produce a multicolored light pattern, which changes as the running speed increases.

Additionally, the device can be included in a body attachable unit, such as a pet collar worn by a dog or other animal. The flashing of different colors attract attention to the dog at night, when visibility is limited. As the dog moves about rapidly, the pattern of multicolored bars would enhance the attention-attracting effect.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
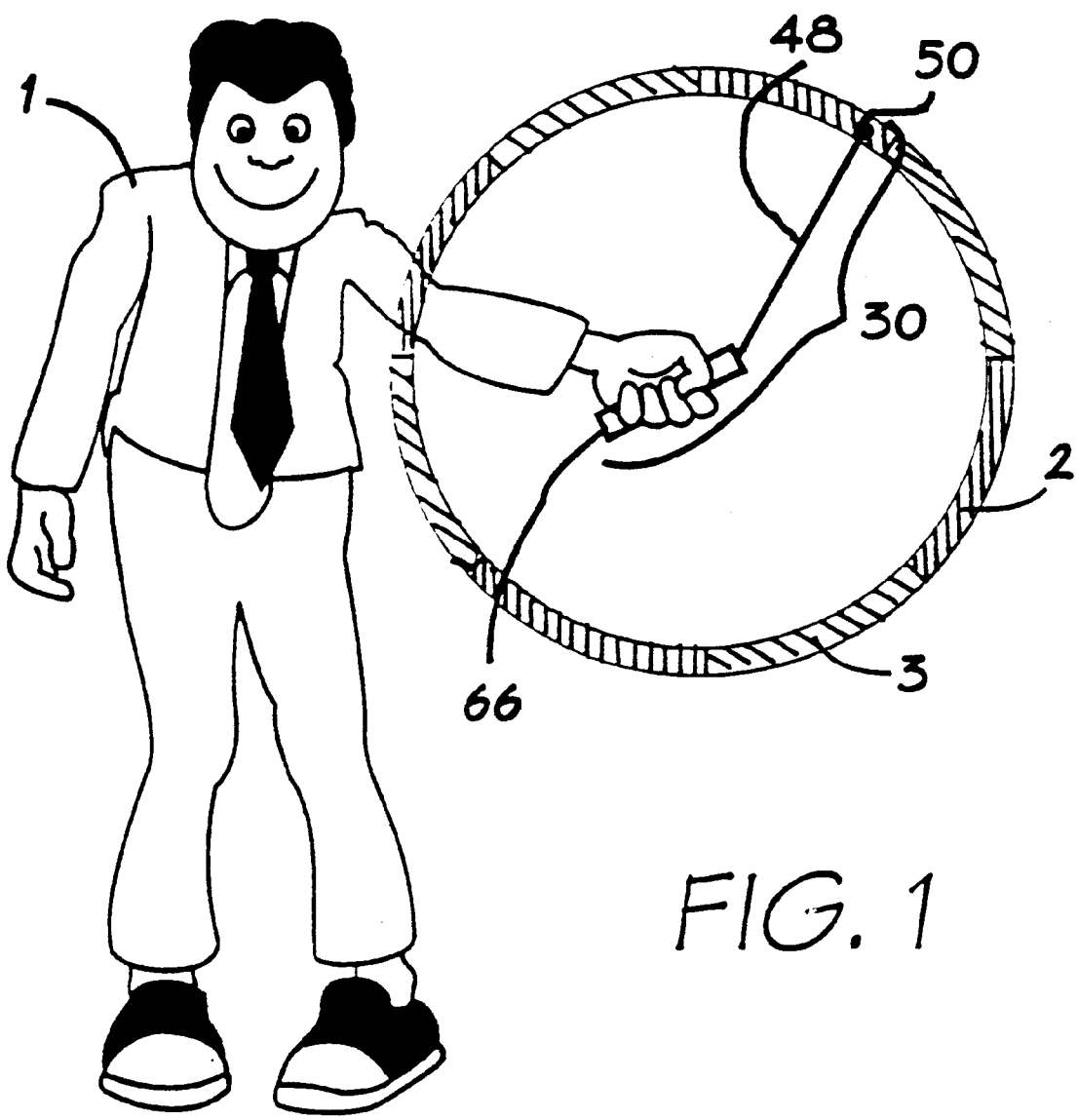
FIG. 1 is an elevational, partly schematic view of an attention-attracting device constructed according to the present invention, illustrating it being used according to a method of the invention.

Referring now to FIG. 1, there is illustrated a person 1 holding an attention-attracting device 30, which is constructed according to the present invention, and which includes a handle or housing 66, a flexible wire or line 48, and a light emitting diode (LED) 50. When the LED 50 is spun or twirled in a circular configuration, a light pattern in the form of a circle consisting of alternating red and green semicircular bars or lines 2 and 3 appears in the air. The faster the LED device 50 rotates, the longer the bar 2 and 3 are perceived visually by an observer. In this regard, the length of the light bars is proportional to the speed of rotation of the LED device 50.

Figure 2:
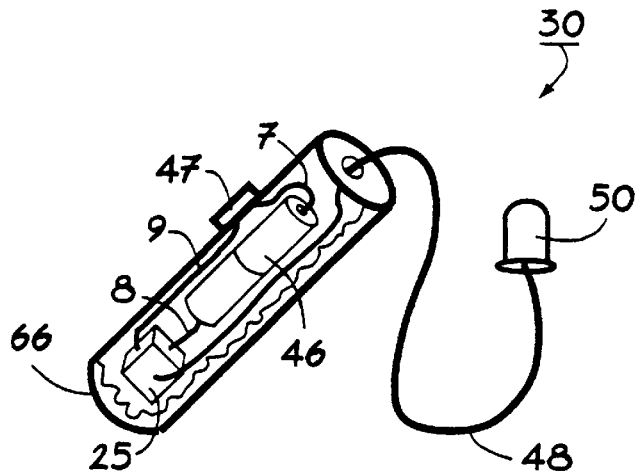
FIG. 2 is a broken away, pictorial enlarged view of the device of FIG. 1.

Referring to FIG. 2, the hollow cylindrical housing 66 encloses an electronic module 25 which causes LED 50 to illuminate in the inventive manner. Battery 46 supplies power to the electronic module via wire 8, via the combination of the wire 7, the power switch 47 and the wire 9. When switch 47 is set to the ON position, the LED 50 illuminates in a manner which will be subsequently described. Due to the flexible wire 48 the LED 50 can be twirled around the housing 66 in a circle as shown in FIG. 1.

The flexible line 48 enables the LED device 50 to be moved to create various unique light patterns. Preferably, the line 48 is about three feet long.

Figure 3:
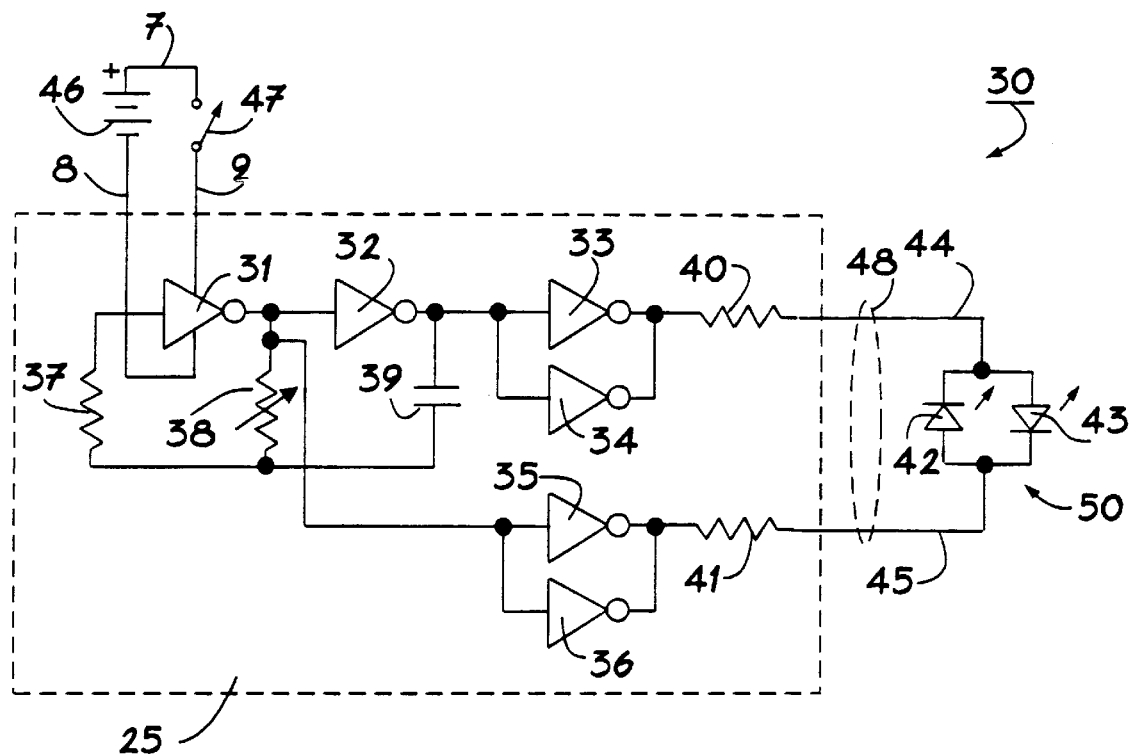
FIG. 3 a schematic diagram of the device of FIG. 1.

Referring now to FIG. 3, the module 25 includes a hex invertor 31–36, which is a CMOS device, capable of operation from 3 volts to 18 volts, and available from various semiconductor manufacturers, such device as the MC14049B made by Motorola Semiconductor as described on pages 6–125 through 6–128 of the Motorola *CMOS Logic Data Book,* Publication number DL131/D, Rev 3, 1991.

Figure 3A:
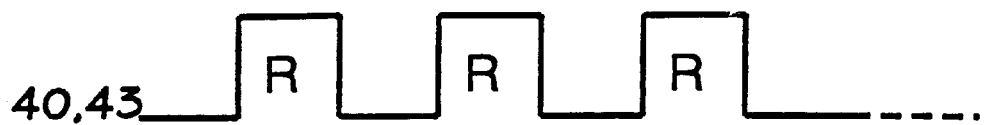
Figure 3A:

Invertors 31 and 32 are connected as an a stable multivibrator, using resistor 38 and capacitor 39 to set the oscillation frequency, and using resistor 37 to stabilize operation at 50% duty cycle. The resistor 38 is a variable resistor to enable the frequency to be varied, and is nominally set at 15 Kilohms. The capacitor 39 is 1 Microfarad, and resistor 37 is 220 Kilohms. The output signal from invertor 32 is a square wave whose frequency is approximately 30 Hz, and the output signal from invertor 31 is also a 30 Hz signal inverted in phase. Thus, the LED drive signals flowing through current limiting resistors 40 and 41 are opposite-phase 30 Hz square waves, as shown in FIG. 3A. Thus, the LED devices 42 and 43 are driven on and off alternatingly. When one of them is on, the other one is off.

The square wave signal from invertor 32 is connected to the inputs of invertors 33 and 34, which are connected in parallel to provide increased current drive. The outputs of invertors 33 and 34 are connected to current limiting resistor 40, which drives the parallel connected, oppositely poled LED pair 50 through conductor 44. The output signal from invertor 31 is a similar square wave signal as from invertor 32, but inverted in phase. The output signal from invertor 31 is connected to the inputs of invertors 35 and 36, which are connected in parallel to provide increased current drive. The outputs of invertors 35 and 36 are connected through the current limiting resistor 41, to drive the LED device 50 through conductor 45. The conductors 44 and 45 form the cable or line 48.

LED 42 is one color, for example green, and LED 43 is another color, for example red. The colors preferably should be contrasting colors, but any two or more different colors may be generated according to the present invention. Although two discrete LED devices are used, a more compact implementation uses a single LED device containing both color LED devices, which has the two diodes connected back-to-back in a single unit. A typical device of this type is the MV5491A Bicolor Solid State Lamp available from QT Optoelectronics, 610 North Mary Ave, Sunnyvale Calif. 94086, and described in the QT Optoelectronics 1995 Data Book (Pages 6–143,144). Since the LED drive signals supplied through current limiting resistors 40 and 41 are opposite in phase, LED 42 and LED 43 alternately turn on and off at a 30 Hz rate. The circuit is powered by battery 46 through power switch 47. Battery 46 can be a conventional 9 volt type, four penlight cells, or multiple "button" cells as used in calculators and hearing aids, if a very compact implementation is required.

If the bicolor LED 50 is observed in a stationary state, a single color is seen with a slight flicker. For the dual LED mentioned above, the color is orange. However, if the LED is rapidly moved from side to side, a surprising pattern of distinct red and green light bars is seen. If the LED is moved rapidly around in a dark room, or out of doors at night time, various patterns of red and green light bar patterns are formed. If the LED 50 is twirled in a circle, a circular pattern of alternating semi-circular red and green light images or light bars 2 and 3 (FIG. 1) are formed.

When the voltage at current limiting resistor 40 is high, and the voltage at current limiting resistor 41 is low, LED 43 is forward biased and turns on, producing a red color, while LED 42 is reverse biased and therefore not energized. Conversely, when the voltage at current limiting resistor 40 is low, and the voltage at current limiting resistor 41 is high, LED 42 is forward biased and turns on, producing a green color, while LED 43 is reverse biased and therefore not energized. When LED 50 is moved through the air, an alternating pattern of red and green bars 2 and 3 (FIG. 1) appear.

Figure 3B:
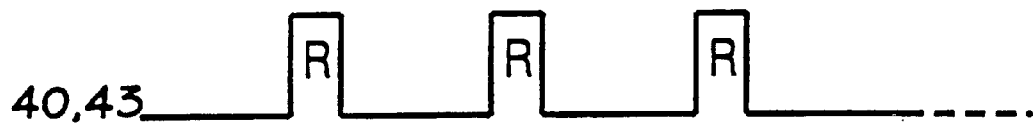
Figure 3B:
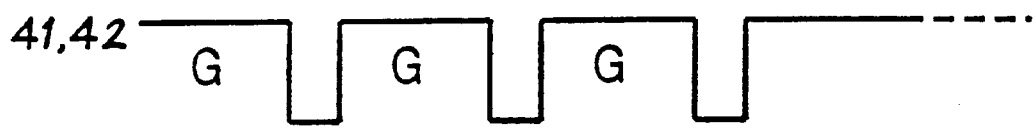
Figure 3C:
Figure 3C:

Different types of on-off patterns can be achieved. For example, if the duty cycle of the multivibrator circuit formed by invertors 31 and 32 is adjusted to be approximately 25%, the waveforms shown in FIG. 3B are produced. The resultant pattern produced by the moving LED is then a "dashed" pattern of long green bars separated by short red bars, where the green bars are approximately 3 times as long as the red bars. As shown in FIG. 3C, a different pattern is achieved, wherein there is a "dead time" during which neither LED is on. This produces equally long red and green bars, separated by dark regions the same length as the red and green bars, i.e. Red-Black-Green-Black-Red.

The a stable multivibrator duty cycle can also be made variable. For example, if the duty cycle is slowly varied from 25/75 to 75/25 and back to 25/75 every two seconds, an undulating pattern of red and green bars increasing and decreasing in length is observed when the LED 50 is moved quickly through space.

When resistor 38 is 15 Kilohms, capacitor 39 is 1 Microfarad, and resister 37 is 220 Kilohms, the output signal from invertor 32 is a 50 percent duty cycle square wave whose frequency is approximately 30 Hz. This oscillation frequency can be adjusted by using different values of capacitor 39 or resistor 38. Because human vision is limited to about 30 Hz bandwidth, if the LED 50 is observed in a stationary state, it appears to be orange (equal values of red and green), with a barely perceptible flicker. The 30 Hz rate has been experimentally observed to give a good range of color bar lengths. At 30 Hz, when the LED 50 is held in the hand and moved about like a sparkler (not shown), the color bars are approximately one to two inches long. At 30 Hz, when the LED 50 is spun around in an 18 inch diameter circle (FIG. 1), the bars range from approximately six inches long to 18 inches long, depending on the twirling speed. An upper oscillation limit would be approximately 200 Hz, due to the shortness of the color bars, even when LED 50 is moved or twirled at very high speed.

It may be desirable to operate the circuit at a lower frequency, for example 1–30 Hz. In an application designed to attract attention at night for safety, the flashing effect is observable even if the LED 50 is not rapidly moving. Even if the commutation rates between red and green are lengthened by lowering the a stable multivibrator frequency, the color bar effect produced by moving the LED 50 is still produced, but with longer color bars.

In general, the length of a colored light segment depends on the velocity at which the bi-color LED is moved, and the LED flash rate. The formulas below use the following variables:

L light segment length, in inches

V Velocity of the bi-color LED, in inches/second.

F frequency of bi-color LED drive signal, in Hz

According to the present invention, the length of any multi-color light segment is, in general, as follows:

$$L=V/F$$

Linear Motion Example

Suppose the drive signal frequency is 30 Hz, and the bi-color LED is moved in a linear direction at 120 inches per second. The length of each colored bar is $$L=120/30$$

This equates to 4 inches per color bar.
Circular Motion Example

Suppose the bi-color LED is attached to a 12 inch wire 48 (FIG. 1) and moved in a circle at two revolutions per second (as in FIG. 1). The linear velocity of the LED is $$V=D/t$$

D is the circumference of the circle with a 12 inch radius. D=2 (PI) (R)=75.4 inches. With the LED traveling two revolutions per second, the velocity V=2 (75.4) 150.8 inches per second. Therefore the color bar length is $$L=V/F=150.8/30=5.03 \text{ inches at a drive frequency of 30 Hz.}$$

If the LED revolves in a circle twice as fast, at 4 revolutions per second, the color bars extend to $$L=V/F=301.6/30=10.05 \text{ inches.}$$

If the linear velocity is held constant and the drive signal frequency is varied, the color bar lengths vary inversely with the frequency. For example, rotating the bi-color LED in a circle with a 12 inch radius at 4 revolutions per second produces light bars of length:

$$L=301.6/F$$

If the revolution rate remains constant at 4 revolutions per second and the Led drive frequency is increased from 30 Hz to 120 Hz, the colored bars reduce in length from 10.05 inches to 2.51 inches, and four times as many of the bars per revolution appear in the air.

This is determined according to the following formula in accordance with the present invention:

$$L=301.6/120=2.51 \text{ inches.}$$

More than two output drive signals can be produced, and energize either multiple LED devices or tri-color LED devices to produce more colors than red and green. A typical tri-color LED is available from Lumex Opto Components, Inc., 292 E. Helen Road, Palatine, Ill. 60067, and designated part number SSL-LX50991GBBW. This device contains one red, one green, and two blue LED chips in a single, six-lead LED housing.

Also, according to the present invention, the device 30 can have overlapping phases of square waves to produce overlapping on and off times of the parallel LED devices 42 and 43 (FIG. 3) to include blended color shades.

Figure 4:
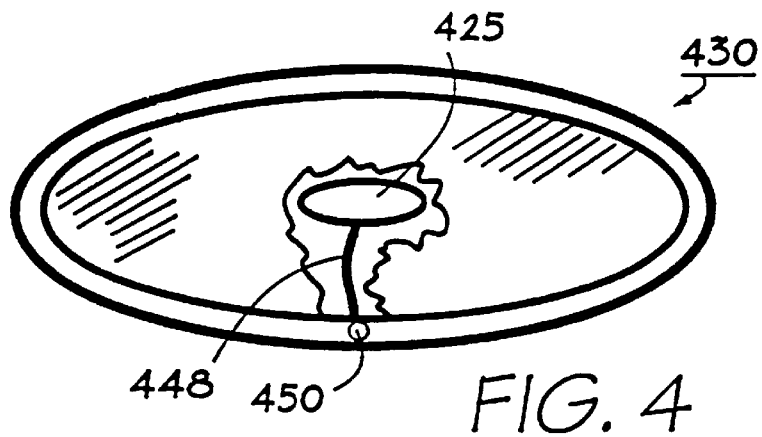
FIG. 4 is another attention-attracting device of the present invention.

Referring now to FIG. 4, there is shown an attention-attracting device 430, which is constructed according to the present invention. The device 430 is throwable similar to a conventional toy marketed under the tradename Frisbee. The throwable circular dish shaped device 430 having a peripheral rim, includes an electronic pack 425 similar to the module 25 of FIG. 3, power switch (not shown) and batteries (not shown) mounted to the central portion of the underside of the device 430. LED 450, similar to the LED 50 (FIG. 3), is mounted in a hole or opening in the rim of the device 430, and connects to the electronic module 425 via a wire pair or cable 448.

Figure 5:
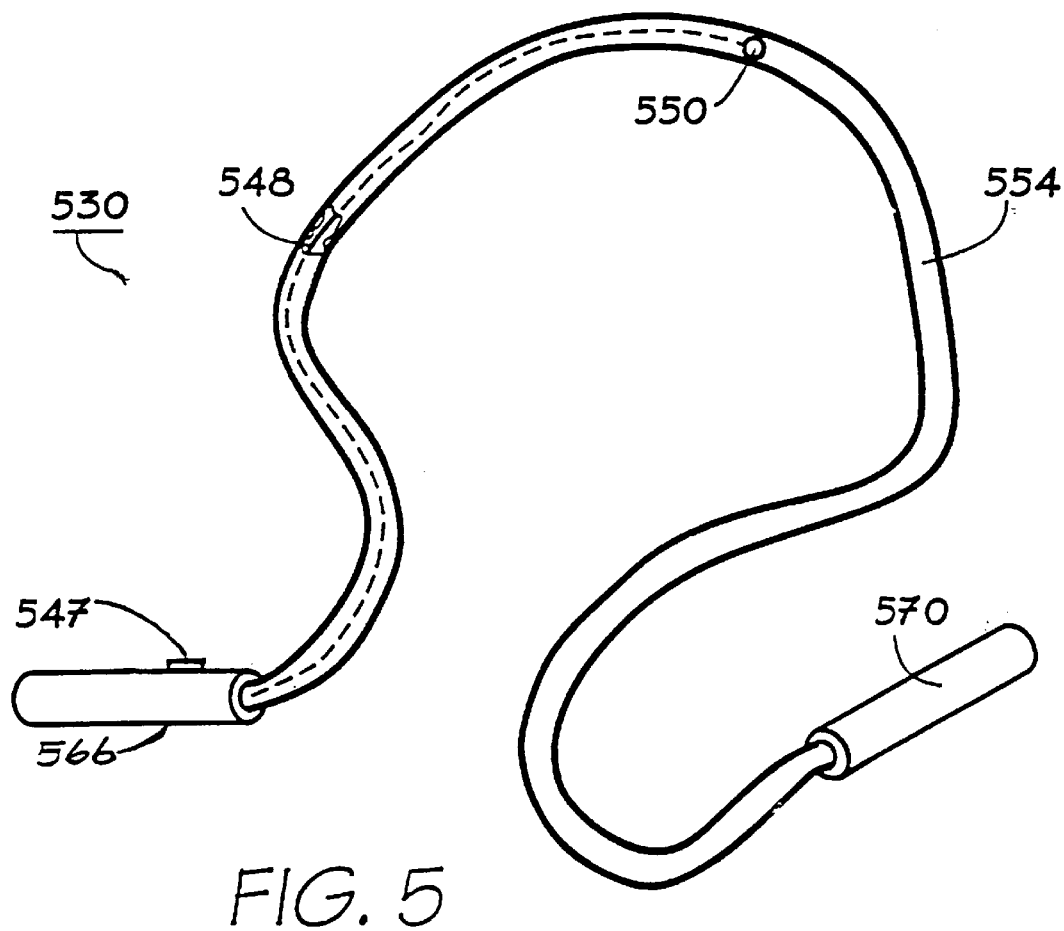
FIG. 5 is still another attention-attracting device of the present invention.

Referring now to FIG. 5, there is shown an attention-attracting jump rope device 530, according to the invention. A handle 566 is substantially the same as the housing 66 shown in FIG. 2, and contains an electronic pack (not shown), battery (not shown), and a switch 547. The connecting wire pair 548 extends inside the hollow flexible line or rope 554, and LED 550 is mounted at the midway point on the rope 554, which extends between the hollow handle 566 and a solid handle 570. This line or rope 554 is made of transparent plastic tubing so that the light emitted by LED 550 can be clearly seen. Alternately, multiple LED's can be mounted at various positions along the rope, including inside the hollow tubular rope. When operated as a jump rope, the LED 550 describes a multicolor patterned circle in the air, similar to the pattern in FIG. 1.

Figure 6:
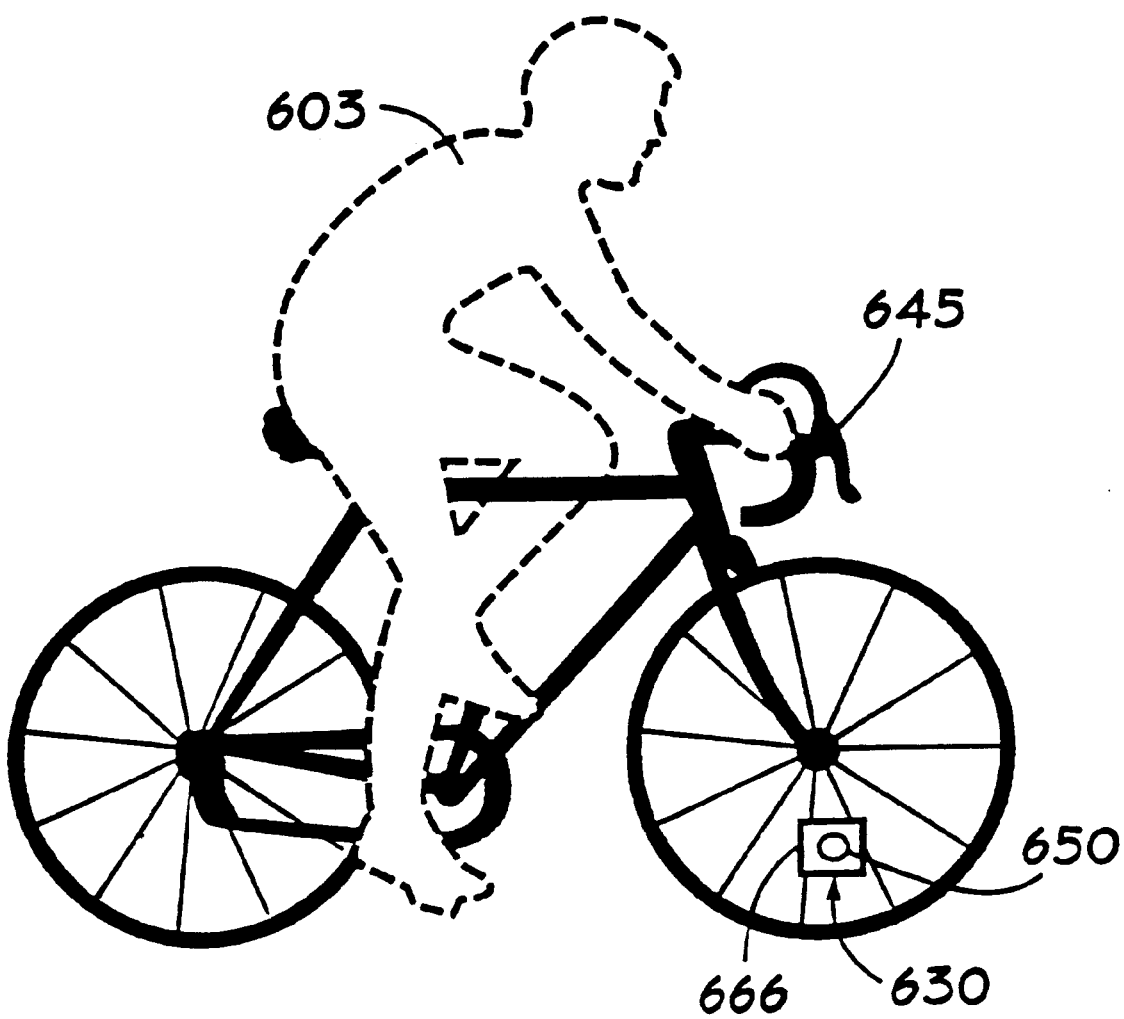
FIG. 6 is a further attention-attracting device of the present invention.

Referring now to FIG. 6, there is shown a bicycle 645 with an attention-attracting device 630 attached to spokes of the front wheel. In the device 630, batteries (not shown), switch (not shown), electronics pack (not shown) and LED 650 are all contained in a housing 666, to function in a manner similar to the device 30. The light pattern described by device 630 is a spiraling pattern of alternating red and green bars, which gives rider 603 a degree of enhanced visibility at night.

Figure 7:
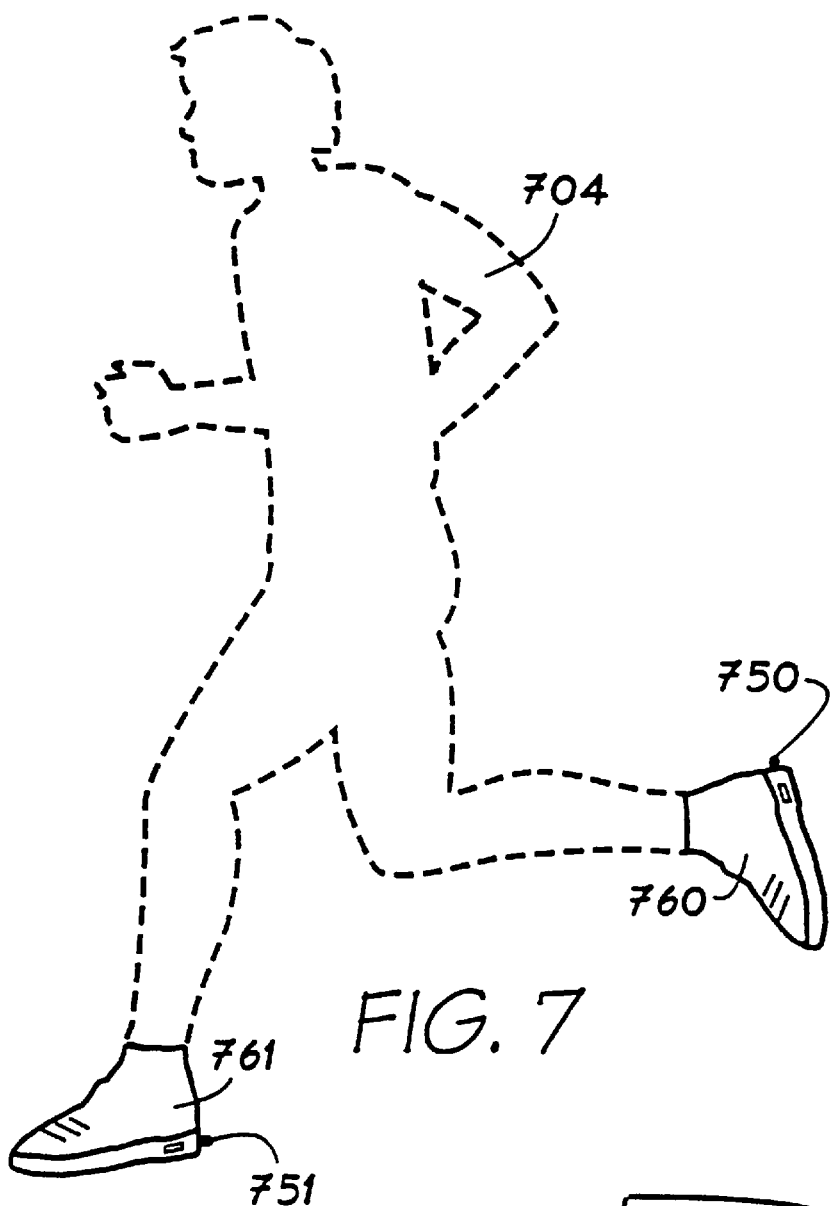
FIG. 7 is a further attention-attracting device of the present invention.

Referring to FIG. 7, there is shown a runner 704 wearing a pair of like attention-attracting shoe constructions 760 and 761 that have LED devices 750 and 751 mounted in the soles of the shoes. The rapid motion of the shoe causes LED 50 to produce the same multicolored bar effect as with the other embodiments.

Figure 8:
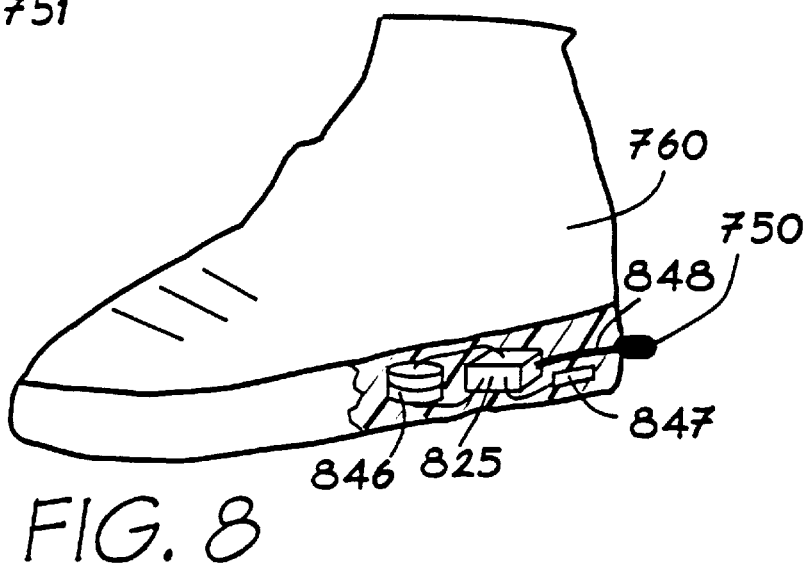
FIG. 8 is a drawing of the shoe in FIG. 7 shown in greater detail.

FIG. 8 shows the running shoe construction 760 in more detail. Batteries 846 are of the "button cell" type for compactness. Switch 847 connects to the electronic module 825 similar to the module 25 of FIG. 3, and the LED 750 is connected to the electronics module 825 via wire 848.

Figure 9:
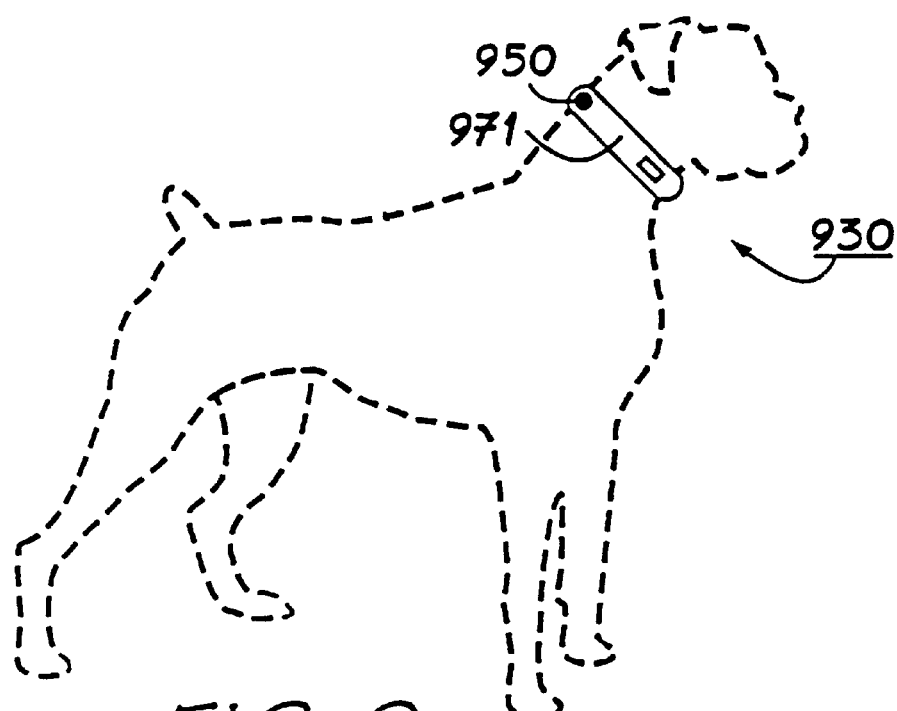
FIG. 9 is yet a further attention-attracting device of the present invention.

FIG. 9 shows a dog 5 wearing an attention-attracting body attachable device 930 that contains the inventive LED device 950. The device 930 is in the form of a pet collar, but it is to be understood that different types and kinds of wearable devices are contemplated. Such devices may be worn by humans as well.

Figure 10:
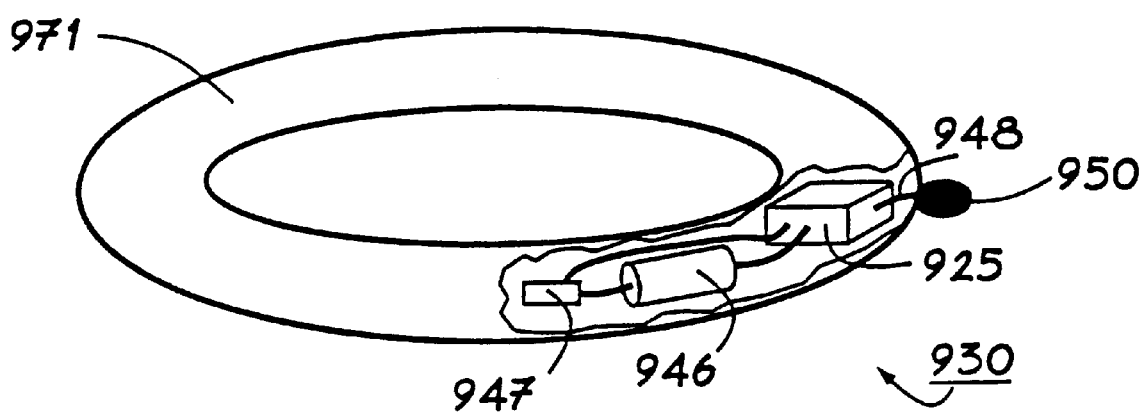
FIG. 10 is an enlarged, broken away view of the device of FIG. 9.

FIG. 10 shows the device to include an annular collar or housing 71 in greater detail, wherein a battery 946 attaches to electronic module 925 similar to module 25 (FIG. 3), power switch 947 connects between battery 946 and electronic module 925, and LED 950 connects to electronic module 925 via wire pair 948. In the case of a multicolor flashing dog collar, the flashing rate should be adjusted so that a multicolor flashing is visible even when the dog is not in motion. Increasing the value of a capacitor (not shown) such as capacitor 39 (FIG. 3) to 3 microFarads, causes the LED 950 alternately to illuminate red and green at a 10 Hz rate, which is clearly discernible as alternating colors to the human eye, even if the dog is stationary. If the dog runs with the collar 971, the multicolored bar effect is seen.

In general, the method and apparatus of the present invention relates to the producing of the attention-attracting light images using an electrically illuminated device including a common light source for emitting alternatingly at least two different colored lights. The common light source is caused to be turned on and off alternatingly at a high rate of frequencey F to emit alternatingly at least two different colored lights substantially indistinguishable from one another when the common light source is motionless. The light emitting device is moved to produce a visually perceptible light pattern comprising a sequence of alternating multi-colored light images. According to one aspect of the invention, the velocity V of the moving of the device causes the length L of each one of the segments of the colored light images to vary with the velocity V of movement of the device in accordance with the formula L=V/F.

In accordance with another aspect of the invention, in general, the frequency F is varied to cause the length L of each one of the segments of the colored light images to vary with the velocity V of movement of the device in accordance with the formula L=V/F. The frequency is varied by changing the setting on the variable resistor 38 of the off stable multi vibrator comprising invertors 31 and 32 of FIG. 3.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method of producing attention-attracting light images, comprising:

using an electrically illuminated device including a common light source for emitting alternatingly at least two different colored lights;

causing the common light source to turn on and off alternatingly at a given high rate of frequency F to emit alternatingly at least two different colored lights substantially indistinguishable from one another when the common light source is motionless;

moving the light emitting device to produce a visually perceptible light patter comprising a sequence of alternating multicolored light images; and varying the velocity V of the moving of the device to cause the length L of each one of the segments of the colored light images to vary with the velocity of movement of the device in accordance with the formula L=V/F.

2. A method according to claim 1, further including varying the frequency F to cause the length L of each one of the segments of the colored light images to vary with the velocity V of movement of the device in accordance with the formula L=V/F.

3. A method according to claim 1, wherein said moving the light emitting device is revolving the device in a circle having a circumference D with a radius R, and revolves at N number of revolutions per unit time T to cause a circular light pattern with the length L of each one of the alternating segments substantially equal to (N)(D)/F.

4. A method according to claim 3, further including varying the circumference D to vary the length. L.

5. A method according to claim 3, further including varying the number N of revolutions to vary the length L.

6. A method according to clam 3, further including varying the frequency F to vary the length L.

7. A method of producing attention-attracting light images according to claim 1, wherein said causing the device to emit light includes overlapping the on and off times of the different lights to include blending color shades.

8. An attetion-attracting device comprising:

light producing means for emitting at least two different colored lights;

said light producing means including a common light source for producing said at least two different colored lights therefrom;

circuit means coupled electrically to said light producing means for causing said common light source to emit alternatingly said at least two different colored lights at a given high rate of frequency F;

wherein said at least two different colored lights are substantially indistinguishable from one another when said common light source is motionless;

means for facilitating movement of said light producing means to produce a sequence of alternating segments of multicolored light images as said common light source moves, each segment having a length L; and means for varying the frequency F for to cause the length L of each one of the segments of the colored light images to vary with the velocity V of movement of the device in accordance with the formula L=V/F.

9. An attention-attracting device according to claim 8, wherein said common light source includes a multicolored light emitting diode device.

10. An attention-attracting device according to claim 8, wherein said common light source includes at least two light emitting diodes connected in an oppositely poled arrangement.

11. An attention-attracting device according to claim 8, wherein said means for facilitating movement includes an electrical flexible cable means interconnecting said light producing means and said circuit means to enable said common light source to be moved freely relative to said circuit means.

* * * * *